United States Patent [19]

Ryan, Jr.

[11] 4,334,771

[45] Jun. 15, 1982

[54] VISUALLY DESCRIPTIVE INFORMATION TRANSMISSION, STORAGE, AND RETRIEVAL SET

[76] Inventor: LeRoy J. Ryan, Jr., 5300 W. Hutchinson St., Chicago, Ill. 60641

[21] Appl. No.: 209,000

[22] Filed: Nov. 21, 1980

Related U.S. Application Data

[60] Division of Ser. No. 892,104, Mar. 31, 1978, Pat. No. 4,241,994, which is a continuation of Ser. No. 483,634, Jun. 27, 1974, abandoned.

[51] Int. Cl.³ .............................................. G03B 00/00

[52] U.S. Cl. .................................... 355/133; 354/292; 355/40

[58] Field of Search .................... 354/292; 355/40, 75, 355/77, 133; 282/21 R, 22 R, 23 R, 25, 258; 40/78.15; 273/152.43; 402/79; 283/1 B

[56] References Cited

U.S. PATENT DOCUMENTS

| | | | |
|---|---|---|---|
| 701,839 | 6/1902 | Callahan | 283/1 B UX |
| 1,156,411 | 10/1915 | Lewis | 282/23 R |
| 1,172,010 | 2/1916 | Cooke | 402/79 |
| 1,305,318 | 6/1919 | Templeton | 40/78.15 |
| 1,698,628 | 1/1929 | Gonzales | 283/1 B X |
| 2,305,970 | 12/1942 | Ledvina | 282/23 R |
| 2,530,634 | 11/1950 | Schuessler | 282/22 R |
| 2,847,235 | 8/1958 | Blumenthal | 282/258 |
| 2,852,278 | 9/1958 | Dere | 402/79X |
| 3,222,086 | 12/1965 | Gosselin | 282/23 R |
| 3,306,632 | 2/1967 | Stahmer | 282/25 |
| 3,502,336 | 3/1970 | Krueger | 273/152.43 |
| 4,241,994 | 12/1980 | Ryan, Jr. | 355/40 X |

FOREIGN PATENT DOCUMENTS

| | | | |
|---|---|---|---|
| 8436 | of 1911 | United Kingdom | 409/79 |

*Primary Examiner*—Richard A. Wintercorn
*Attorney, Agent, or Firm*—Lloyd L. Zickert

[57] ABSTRACT

A visually descriptive information transmission, storage, and retrieval set, and method of making a preliminarily reproduced set of same. The set utilizes a plurality of sheets of substantially white paper. Each sheet comprises an image area centrally located thereon and coding means of a different nature on each sheet in a set. The coding having a pattern, color, and saturation is located between the image area and at least one edge of each sheet. The coding readily visually identifies each sheet in the set as a distinct entity permitting proper routing or filing thereof. The paper set also has chemical coatings on each sheet which are pressure activated to cause reproduction on successive stacked sheets of data when pressure is applied to the top sheet. Portable vehicles in which sheets of the set may be placed are likewise coded for distinct identification. The method utilizes sheets or overlays of transparent material, having differing coding including a pattern, color, and saturation located thereon. The overlay sheets are used with a paper master sheet having predetermined image area indicia to reproduce on a copy machine sets of reproduced sheets having differing coding on each sheet. Overlay sheets may also be used on a need-to-know basis to encrypt or decipher data on sheets in a set if the data is not otherwise recognizable.

1 Claim, 13 Drawing Figures

VISUALLY DESCRIPTIVE INFORMATION TRANSMISSION, STORAGE, AND RETRIEVAL SET

This application is a division of application Ser. No. 892,104, filed Mar. 31, 1978, now U.S. Pat. No. 4,241,994, issued Dec. 30, 1980, which is a continuation of my earlier application Ser. No. 483,634, filed June 27, 1974, now abandoned.

This invention relates to a plurality of sheets combined to define an assembly or set of forms to have the same data useful in several departments of a business where data applied to the top sheet will be reproduced on the other sheets, and a method for making preliminarily reproduced sets utilizing a copy machine. More particularly, the invention relates to a plurality of stacked paper sheets separably joined as a set having similar image areas and wherein each sheet has a distinct coding around a portion of its outside edge for facilitating routing, transmission to, storage in, and retrieval of each sheet from, a predetermined location. Portable vehicles in which a sheet from the set may be contained are likewise coded for ready identification.

The method relates more particularly to the use of a plurality of overlay sheets made of transparent material. Some of the sheets have a distinct coding around a portion of the outside edge. Each coded overlay sheet is superposed on a paper master sheet having data input identifying indicia in the center thereof and the combination is reproduced sequentially in a copy machine. A plurality of these reproduced sheets are combined into a preliminarily reproduced visually descriptive information transmission, storage, and retrieval set.

Also, overlays having input identifying indicia imprinted in the image area may be utilized to encrypt data in particular locations in image areas of a set, or to decipher data from a sheet which does not have identifying indicia thereon for security reasons.

Heretofore, multi-sheet paper sets suitable for use in business operations have utilized different color sheets to identify where and to whom each sheet in a set is to go. The number of colors available to make up sheets in prior sets was severely limited by the number of colors of which the eye could discriminate, and the number of colors upon which printed type or writing could be placed and yet easily read. Sheet colors generally in use for such sets are white, pale yellow, pink, pale green, and pale blue. Heretofore, a paper set comprising a number of sheets in excess of the number of available and usable colors, had to be composed of more than one sheet of some of the colors.

Multi-sheet paper sets are utilized by suitably entering symbols on a top sheet of the set which is transferred to subsequent sheets thereunder by use of carbon paper or pressure sensitive chemical coatings between sheets which when activated form an ink. After the necessary information is written on the top sheet, the sheets are separated and sent to different locations for business action at each location affected. Written information which is important to the total business action but either not needed at a certain location, or possibly harm producing if known at a certain location, is usually blanked out of the sheet wherein it is not desired. Heretofore, the limited number of colors available for sheets in a multi-paper set has resulted in confusion if two or more sheets of the same color having different or sensitive information located on each sheet were to go to the wrong location for business action thereon. One solution to this problem has been the addition of individual written or printed matter on each of several sheets having the same basic color to distinguish them. However, additional printed matter does not readily visually distinguish the differences in a plurality of sheets having the same basic color thereby maintaining the chance for error in routing, filing, and retrieval.

The invention disclosed herein solves existing problems relating to the limited number of distinctly different sheets available in a paper unit or set by making each of the number of sheets in a set of substantially white paper, and locating a coding around at least a portion of the outside of each sheet with a different pattern, color, or saturation on each sheet.

First, substantially white sheets are used throughout the assembly to allow easy readability of all printed matter located thereon. This solves the problems existing, for example, in reading a black or dark blue printing on a dark blue, dark green, or dark brown sheet.

Second, coding having a pattern, color, and saturation placed around at least a portion of the outside edge of each sheet enables different sheets, in most cases, to be readily identified and distinguished if at least one of pattern, color and saturation is changed for each sheet in the set. It should be noted the coding is located on portions of each sheet where written information is generally not placed, such as the outside border. In other words, use of coding of the invention on a standardized size sheet does not diminish or interfere with the amount or location of information which can normally be printed or written thereon. Also, if graphic information on a sheet is to be electronically transmitted, a scanning device is set to cover only the image area thereby saving scanning time and cost.

Third, the combination of substantially white paper and codings having colors at the outside border of each sheet expands the number of colors which may be utilized in multi-paper sets. Since the color is not located in the central image area where printing or writing occurs, colors such as dark blue, dark green, or dark brown may be utilized even though the writing or printing uses dark blue ink. Also, different shades, i.e., saturation, of each color may be utilized to form distinctly different papers in a set. For instance, light blue, dark blue and medium blue border coding may be used in different sheets of one set and still be readily visually distinguishable to people using that set or receiving individual sheets therefrom. Also, different patterns utilizing the same color and saturation create distinctly recognizable individual sheets in a set. For instance, one sheet may be a solid pattern, and another striped, a third cross-hatched, and so forth.

Fourth, if a sheet in the set is sent to the wrong location, a person receiving that sheet will visually perceive it as in an improper location immediately upon receipt. To further facilitate placement in its proper location, the sheets have blocks or windows located within the coded area indicating such factors as to whom the sheet goes, location of the final resting place of each sheet, the organization which receives the sheet, and purpose of the sheet.

Fifth, vehicles, such as folders and envelopes in which the sheet is to be transmitted or stored are also similarly coded for ready identification.

The method of making a preliminarily reproduced visually descriptive information transmission, storage and retrieval set comprises using at least one overlay and an individual paper sheet together to reproduce a stack of differing sheets making up a set. An overlay sheet is placed on top of or superposed with a sheet of paper having data input identifying indicia located centrally thereon so that the indicia appears within the image area of the overlay sheet. The combination is then placed in a copy machine so a copy made by the operation of the machine will comprise the additive elements of the overlay sheet and piece of paper, i.e., a sheet of paper having coding means at the edge thereof identical with coding means on the overlay sheet, and the written indicia of the paper sheet located within the central portion of the copy.

This method is repeated with the substitution of overlay sheets. A second copy is then made in the same manner as the first. The method is repeated using different overlays until the desired number of copies in a set are produced. Sheets obtained by this method are then combined to form a preliminarily reproduced visually descriptive information transmission, storage, and retrieval set similar to an offset printed set or the like except for quality of reproduction in both shades of color and sharpness of printing located thereon resulting from use of a copy machine. The method is employed by systems designers or planners working in a business to tailor-made indicia for each individual application.

Overlays also containing input identifying indicia and data windows are used if the data is of a confidential nature. Data may be encrypted in a blank image area of a standardized set by superposing the overlay on the set and pressure scribing data in the appropriate windows of the overlay. The transfer copy means between sheets prints the data on certain of them. Then, anyone having a similar overlay may later decipher the data from a sheet by superposing the overlay with it.

It is therefore an object of the present invention to provide a new and improved visually descriptive information transmission, storage, and retrieval assembly, each sheet in a set therein visually distinctive from any other sheet in said set, wherein the number of distinctly different copies available in said set is greater than the number heretofore available.

A further object of the invention is to provide a visually descriptive information transmission, storage, and retrieval set including a plurality of connected sheets of substantially white paper, wherein application of a pressure image on the top sheet reproduces the same image on the other sheets, and wherein coding having differences in at least one of pattern, color, and saturation on each sheet enables quick and positive distinct identification of each sheet for routing, action and/or filing purposes.

Another object of this invention is in the provision of a structure comprising sheets of transparent material having distinctly different coding means around at least a portion of the outside edge of each sheet usable for preliminary reproduction of a custom-tailored visually descriptive information transmission, storage, and retrieval set of the invention, wherein paper sheets having written data input identifying indicia thereon are superposed with at least one overlay sheet, placed in a copy machine so as to reproduce a copy having the features of each of said sheets additive thereon, and repeated by substituting a different overlay sheet for each copy made to produce a preliminarily reproduced visually descriptive information transmission, storage and retrieval set.

A further object of the invention is the provision of a set for utilizing data which can be encrypted and then deciphered on a need-to-know basis by superposing an overlay therewith providing the identifying indicia for the data.

An important object of the invention is to psychologically provide stimulation for and remove the drudgery of filling out, transmitting, storing, and retrieving activity involving paper work, and to reduce human error in same by providing a paper set structured in a more efficient and lively manner than heretofore known.

Other objects, features, and advantages of the invention will be apparent from the following detailed disclosure taken in conjunction with the accompanying sheets of drawings, wherein like reference numerals refer to like parts, in which.

Figure 2:
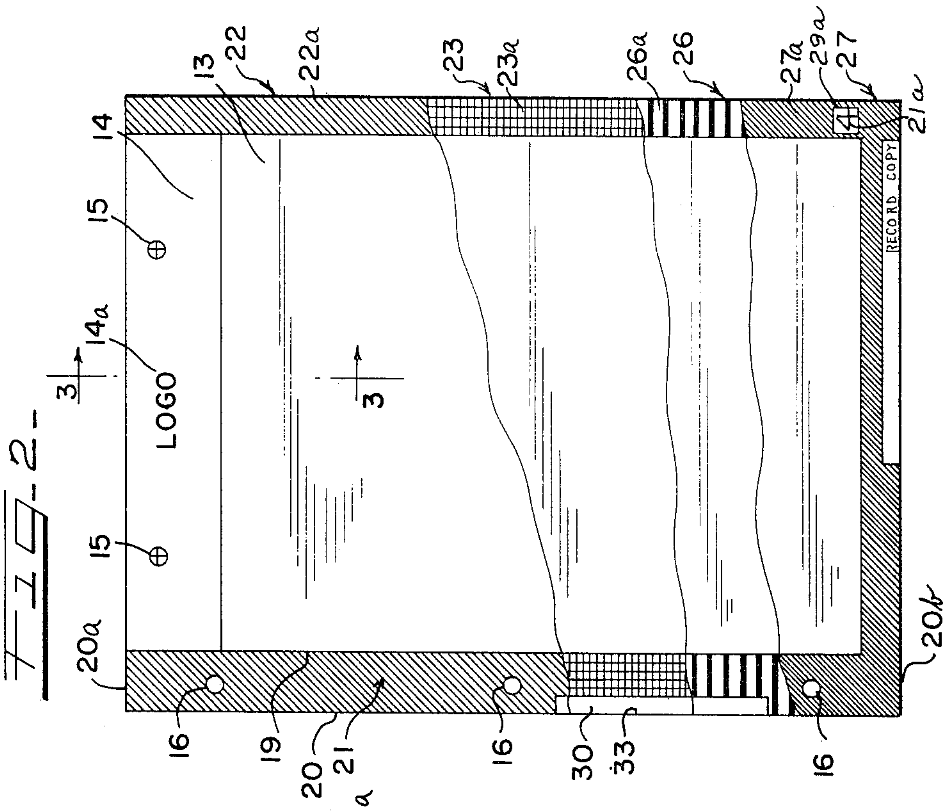
FIG. 2 is a plan view of the pad shown in FIG. 1 wherein each successive page has a lesser partial section therethrough showing differences in pattern and saturation between codings on successive sheets.
Figure 1:
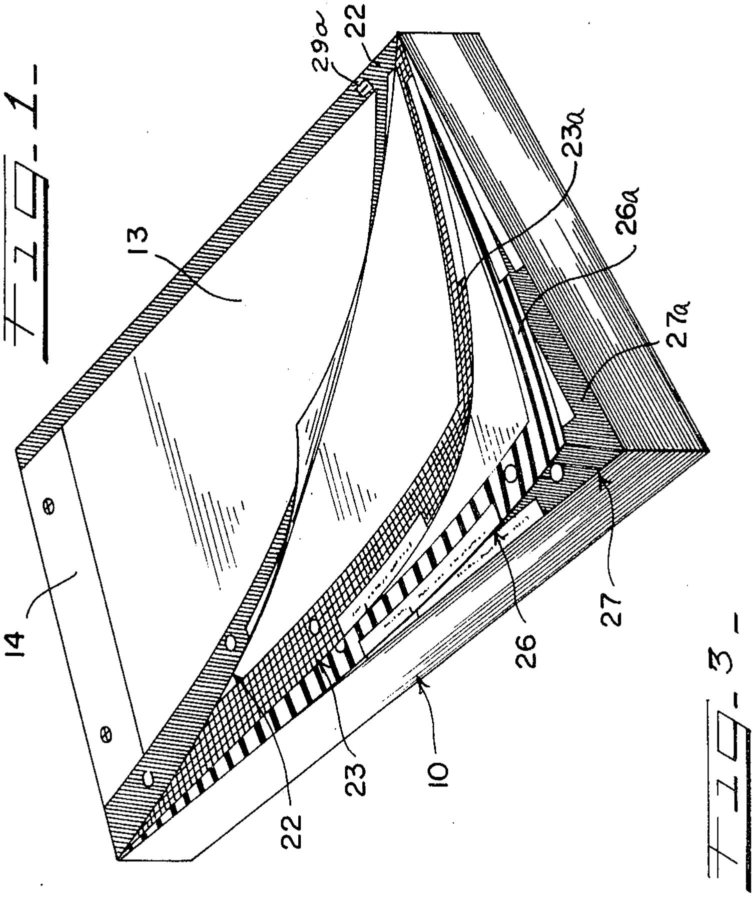
FIG. 1 is a perspective view of one form of the invention in a pad assembly with successive sheets in said pad having different coding thereon so a desired number of distinct sheets is obtained to form a set, a plurality of which forms an assembly.

Referring now to the drawings, one embodiment of the invention is in pad form shown generally at 10 in FIG. 1. The assembly includes a predetermined number of sets, each having substantially white paper sheets in stacked relation fastened together at 20*a* with a clean tearing adhesive glue, each sheet comprising as shown in FIG. 2, a central image area 13 which may be blank or have data input identifying indicia located thereon as required. Each sheet also has a logo or letterhead area 14 at the top thereof. The logo area 14 of any sheet used in a business does not usually contain substantive information. Also, if any sheet is placed in an arch type binder the top area is made useless for transmitting, storing, or retrieving information. Therefore, logo area 14 is designed as small as efficiently possible for any size paper upon which the invention is skilled. However, a letterhead, or organization symbol 14*a* may be placed in the logo area 14. Also, each sheet has markings 15 or punch holes 16 if the sheet may eventually be placed in a binder. The holes or markings are conventionally located adjacent the edge 20 of each sheet near at least one of the top and left-hand sides thereof.

A coding means shown generally at 21 is imprinted in an area located between image area border 19 and at least one edge 20 of each sheet. In the embodiments shown in this application coding means are located, at least partially, on the top edge of the sheet and completely on the side and bottom edges. It should be appreciated that coding covering a lesser area may still make each sheet in the system visually distinctive. Coding means 21 may have differences in pattern, color, and saturation to produce distinctiveness for each sheet. Coding at 22*a* and 27*a* on sheets 22 and 27, respectively, in FIG. 2 are meant to show a difference in saturation between solid pattern codings with the saturation of 27*a* bein greater than the saturation of 22*a*. Codings at 23*a* and 26*a* have different patterns, cross hatching on sheet 23 and stripes on sheet 26, respectively. The differences obtainable in pattern and color are almost indeterminate.

Figure 13:
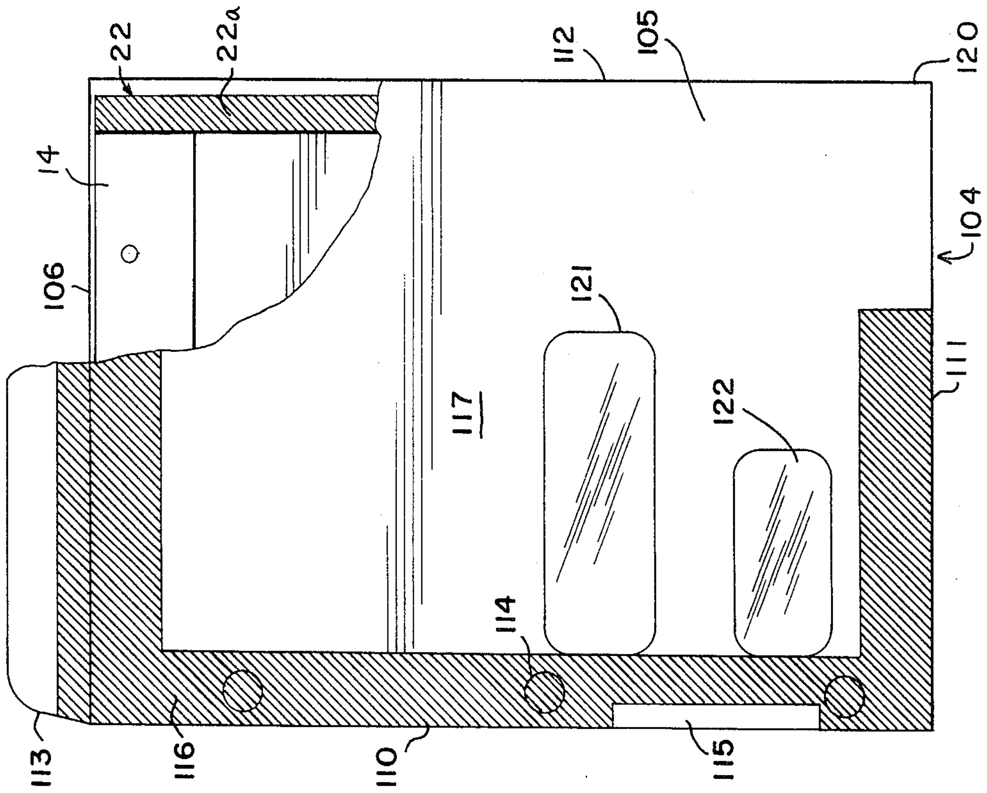
FIG. 13 is a plan view of the combination of a sheet of a set and an envelope partially cut-away having a coded border.
Figure 12:
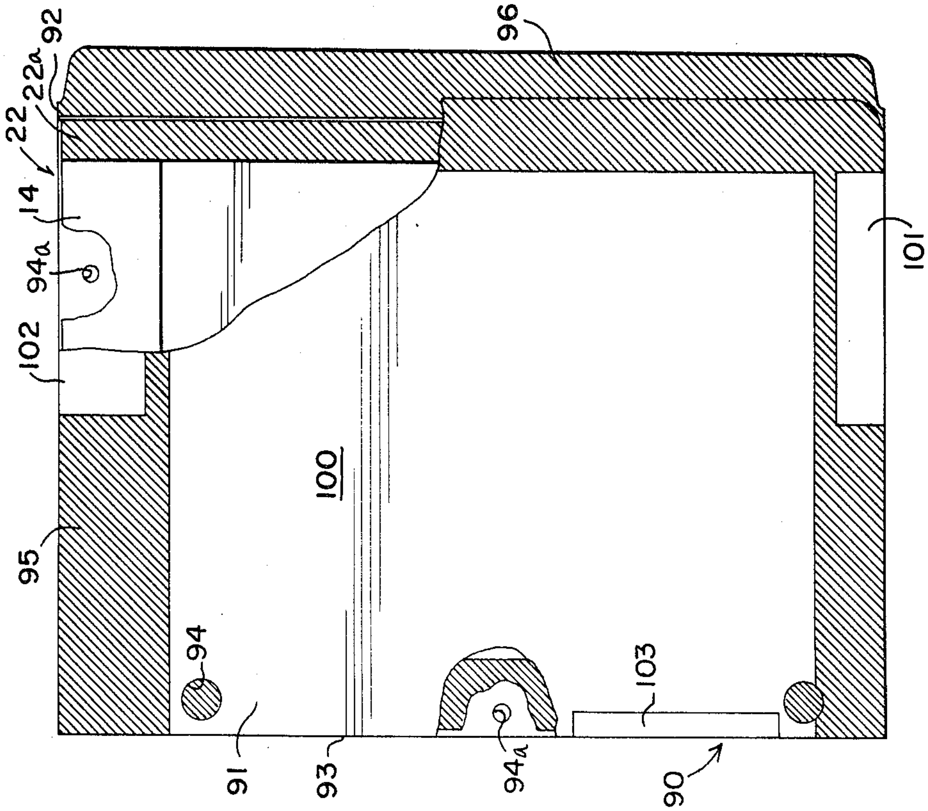
FIG. 12 is a plan view of the combination of a sheet of a set and a folder partially cut-away having a coded border.

As can be seen in FIG. 2, the differences between coding at 22*a*, 23*a*, 26*a*, and 27*a* are readily visible. For example, a person or organization who would normally receive a copy having cross-hatched coding 23*a*, would know instantaneously that a wrong copy had been received if he received a copy with coding 27*a* on it. More important, the person distributing the copies would quickly and readily determine the proper routing so each copy would reach the proper destination. Also, the distinctiveness of each sheet received by a person or organization reduces error in retrieving a sheet from storage. Retrieval may be further aided by coding file folders and envelopes in a like manner as shown in FIGS. 12 and 13, respectively. It should be noted that while differences obtainable by varying pattern, color, and saturation are limitless, in practice, the human eye has different sensitivities toward colors. This means that in certain particular colors the differences between a 30% saturation of that color and a 60% saturation of that color may not be readily distinguishable to everyone. Therefore, some colors are better than others for visual differentiation purposes. However, this limitation does not effectively lessen the number of distinctly different copies which a set of the invention may contain.

Figure 3:
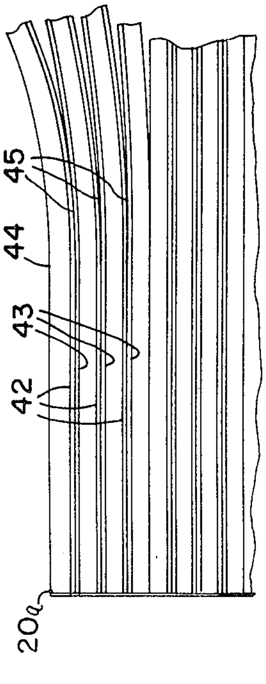
FIG. 3 is an enlarged sectional view taken along line 3—3 of FIG. 2 showing coatings on the sheets for image reproduction.

In FIG. 3, a chemical reagent 42 is shown as a coating on the back side of each sheet in each set excepting the last sheet. A complementary chemical reagent coating 43 is shown on the front side of each sheet in a set excepting the top sheet. These coatings are pressure sensitive such that data pressure applied to the top sheet will be reproduced on the other sheets in a set. Coating 42 and complementary coating 43 are pressure sensitive so marking side 44 of a top sheet in a set with a marking instrument causes pressure directly thereunder creating a chemical reaction between complementary reagents on adjacent sheets causing an ink to be formed on the top side 45 of subadjacent sheets in each set. Coating is omitted between sheets where writing reproduction is not desired. Also, the top sheet having a coating on its back side may be used solely as a carboning blank and a non-coated business letter sheet for external use may be added to the top of the set as the ribbon copy.

It would be possible to have uncoated areas within image area 13 where selectively distributed sensitive information is written. However, it is easier to apply obliterating printing to such an area when the coding is applied during manufacture. Any writing thereafter reproduced in that printed area will be illegible.

Figure 4:
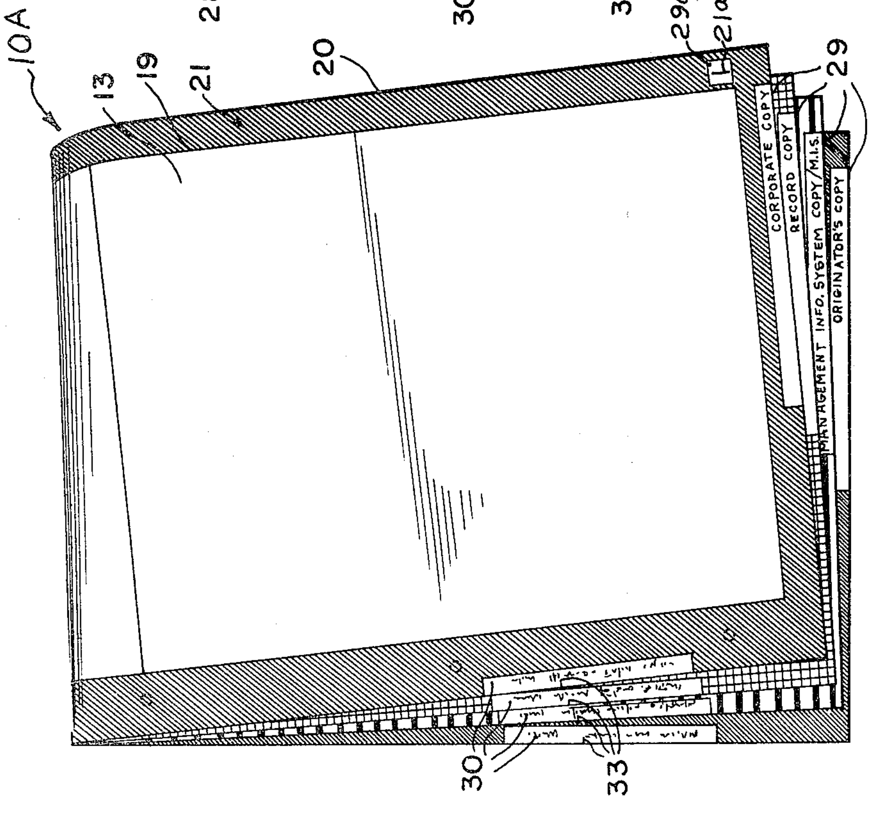
FIG. 4 is a top-plan view of a standardized set with windows or blocks in the coding area having successive pages separated to show differences in copy within successive windows.

FIG. 4 shows a set of sheets 10A having a standard border 19 between central image area 13 and coding means 21. This standard border 19 is made of rectilinear lines. It should be noted in the embodiments shown that border 19 usually has a higher percentage saturation than other printed areas on each sheet. This is done to easily distinguish different areas of each sheet. The pattern, color, and saturation of border 19 may well be equal to that of the coding means, i.e., the border can be indistinguishable from the coding means. Also, the length-width ratio of the standard image area is compatible with scanning devices of known graphic data electronic transmitting hardware.

Figure 5:
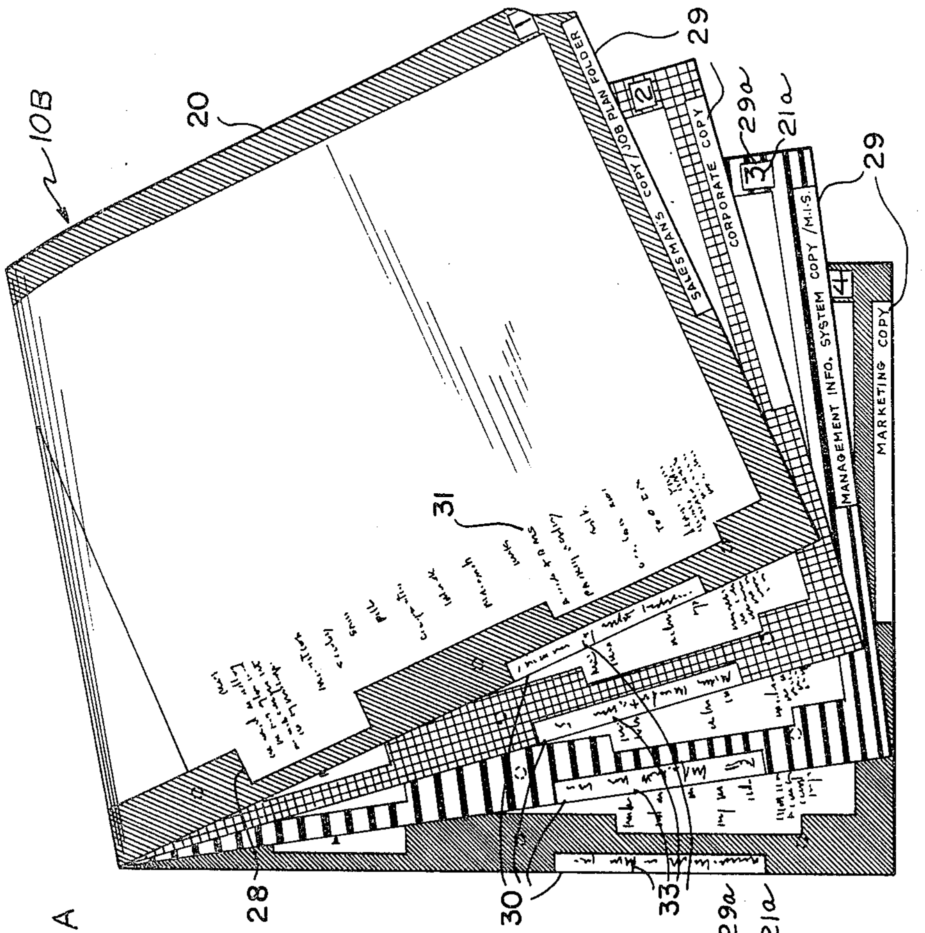
FIG. 5 is a top-plan view of a customized set similar to that shown in FIG. 4 and having an irregular border on one side and predetermined data input identifying indicia in the image area.

A custom border at 28 on set 10B designed to meet special needs of image area spacing is shown in FIG. 5. FIGS. 4 and 5 further show blocks or windows at 29 and 30 which are located in the coding area 21 between image area border 19 and the edge of each sheet 20. The block is, in this embodiment, rectangular in shape. It can be appreciated that another similar shape could form the same function. Blocks 29, in this embodiment, have printing therein identifying at least one of who or what department is to obtain which sheet, who or what department is to retain which sheet, and the location of the sheet's final resting place. Blocks 30, in this embodiment, are used to identify at least one of which functional organization is to receive or retain each sheet and the purpose of the sheet. It should be appreciated that the information printed on these blocks may be changed, the number, location, and size of blocks may be altered, and the border of the blocks may blend with or be distinct from the coding without departing from the scope of the invention. For instance, block 29*a* adjacent block 29 is smaller than the other blocks and contains an alternate coding means 21*a* in the form of a number, letter, or like symbol which may be utilized by color blind persons to readily identify each sheet in a set.

As seen in side window 30, a marking at 33 along edge 20 of each sheet approximately two-thirds the distance from the top edge 20*a* to the bottom edge 20*b* of each sheet is located to provide ease of precise folding of each sheet into thirds for placement in a standard size business envelope. In operation, when a sheet is removed from pad 10 it is folded so edge 20*a* is at marking 33 when a first crease is made. The sheet is then folded again with the second crease being approximately at marking 33. It can be appreciated that marking 33 could be placed one-third of the distance between edge 20*a* and edge 20*b* without detracting from its function. Also, since the sheet size can be other than a standard 8½"×11" dimension, marking 33 can be placed at another location along an edge of the sheet to facilitate folding to a size which will fit an appropriately sized envelope.

Figure 6:
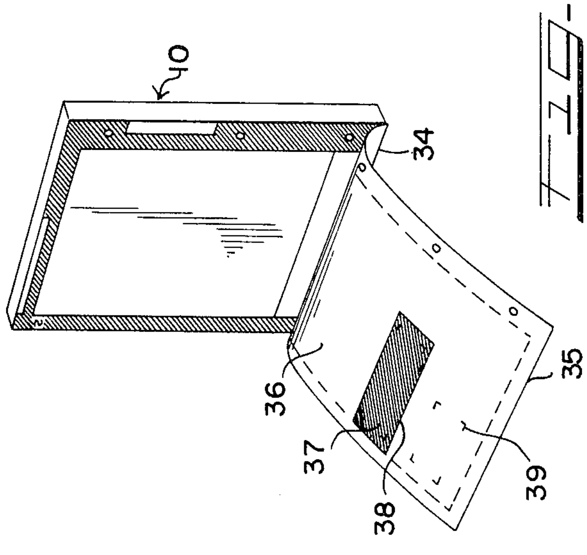
FIG. 6 is a perspective of a pad assembly turned upside down with a sheet turned outward therefrom to reveal two addressing blocks on the rear side thereof spaced so when the sheet is inserted flat into an envelope or folded into an envelope of smaller size the address and routing or other identification will be oriented to appear in at least one window of the envelope.

In FIG. 6 the pad 10 is shown turned upside down with a sheet bent outwardly to display a back side 36 thereof. An address block 37 having a pattern, color, and saturation is located on the back side 36 such that a bottom line 38 of the block 37 is located approximately two-thirds the distance from top edge 34 to bottom edge 35 of the sheet. The organization and location to which the sheet is to be sent may be placed in the address block and the color of the block identifies the sheet to expedite routing. After the sheet is folded into thirds, as previously discussed, and placed correctly into a windowed business envelope, address block 37 will appear through the window. A second block 39 is located adjacent block 37 for placement of additional information thereon and for the insertion of said sheet into an envelope, such as shown in FIG. 13, approximately the size of said sheet having two correspondingly located windows for appearing of said blocks therethrough.

In FIG. 5, data input identifying indicia 31 is shown. This indicia and logo 14*a*, FIG. 2, may be printed on each sheet as the coding is applied to custom made assemblies during manufacture, or it may be applied by other means such as crash printing which utilizes the sheet chemical coatings for reproduction. A set including custom indicia which is imprinted in the image area as the coding is applied is justified when a large number of sets are required. However, if only a small number of sets are necessary, a set including only coded and coated sheets already stacked together may have custom indicia crash imprinted in the image area and/or the logo area inexpensively. The indicia specifies which data is to be recorded and defines its storage location on the sheet and is individually formulated by systems designers or planners for a specific function and a defined activity. More specifically, indicia may include imprinted lines, windows or blocks, textual material, or the like. A method of use for formulating the indicia is hereafter disclosed. Also, it should be noted that any data input identifying indicia printed in the image area should have a fairly low saturation level so that symbols applied to the image area during use will stand out from the printing and be more readily distinguishable. Also, symbols made on a top sheet 44 in a set may be reproduced on sub-adjacent sheet top sides 45 by use of carbon paper interleaved therebetween without departing from the scope of the invention.

Figure 8:
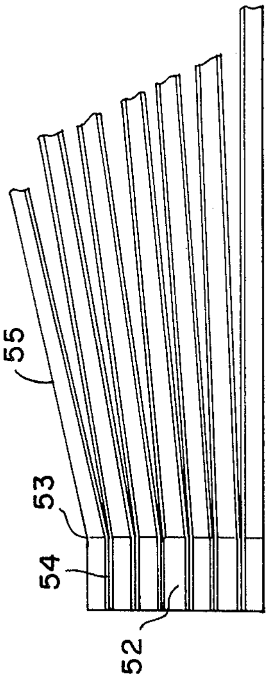
FIG. 8 is a partial cross section taken along line 8—8 of FIG. 7 showing the bound stub area, the perforations, and coatings for copy reproduction.
Figure 7:
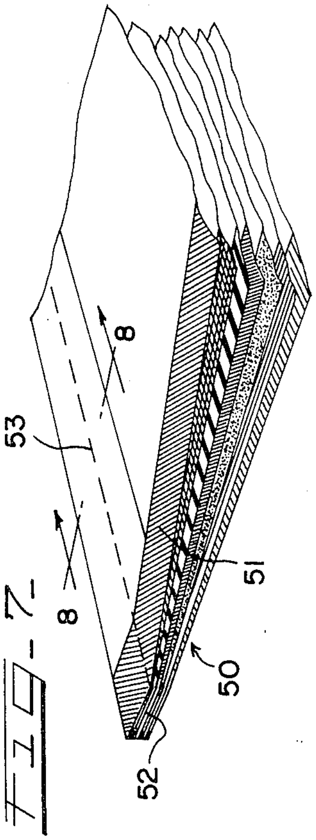
FIG. 7 is a partial perspective of a modification of the invention wherein the number of sheets necessary to complete a set are bound together in a bursting system.

A first modification of the invention is shown in FIG. 7, wherein all sheets in the stack or bursting system generally shown at 50 have different coding means at 51 and the stack contains only one complete set of sheets. The sheets are connected together at a stub end 52 by gluing, stapling or the like. Each sheet has perforation lines 53 marking the inside edge of stub 52. FIG. 8 shows the stub end 52 of the burst system 50 and the perforation lines 53 at the inner edge of the stub 52 which allows removal of individual sheets in the set after marking has been completed. The top sheet 55 of the set is marked when in use and the marking is reproduced by chemical coatings 54 on subsequent sheets thereunder as in the first embodiment. The perforations at 53 are constructed such that a swift jerking movement while holding stub 52 in one hand and the sheets in the other separates all sheets from the stub. The sheets are then sent to their predetermined locations.

Figure 9:
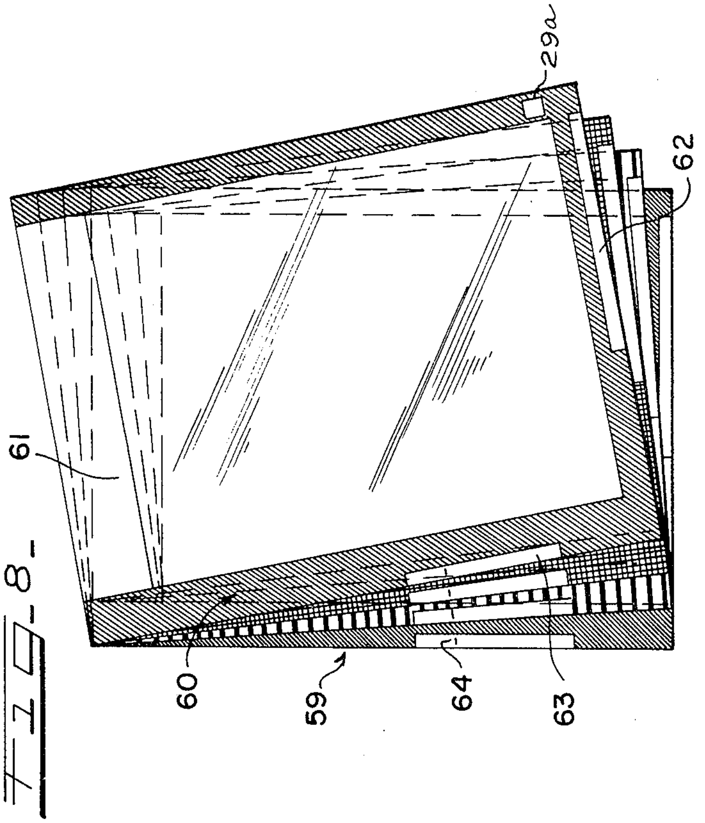
FIG. 9 is a front plan view of a further modification of the invention including a plurality of stacked transparent sheets canted in order to show differences in the coding on each sheet which are utilized in connection with the method of making a preliminarily reproduced paper set.

A second modification of the invention is shown at FIG. 9 where the stack of sheets of the invention, generally noted at 59, is made of transparent material to form overlays. Otherwise, the sheets have the same coding area 60, logo area 61, windows or blocks 62 and 63, and folding marking 64, as prior embodiments. However, blocks 62 and 63 do not have printed routing characters in them as these overlays sheets are meant for use in developing and planning a permanent visually descriptive information transmission, storage and retrieval set. Additional overlays may be custom made to contain only printed routing characters and logos, and two or more overlays may be used together for reproducing a final product.

Figure 11:
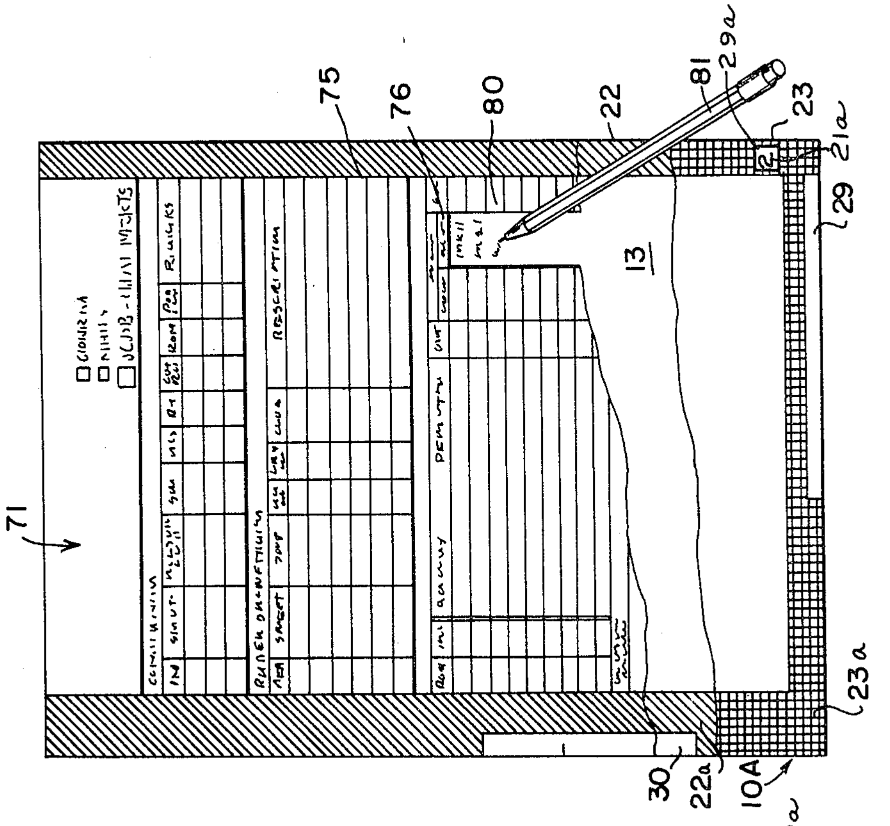
FIG. 11 is a plan view similar to FIG. 10 wherein the overlay is opaque and the window is a cutout.
Figure 10:
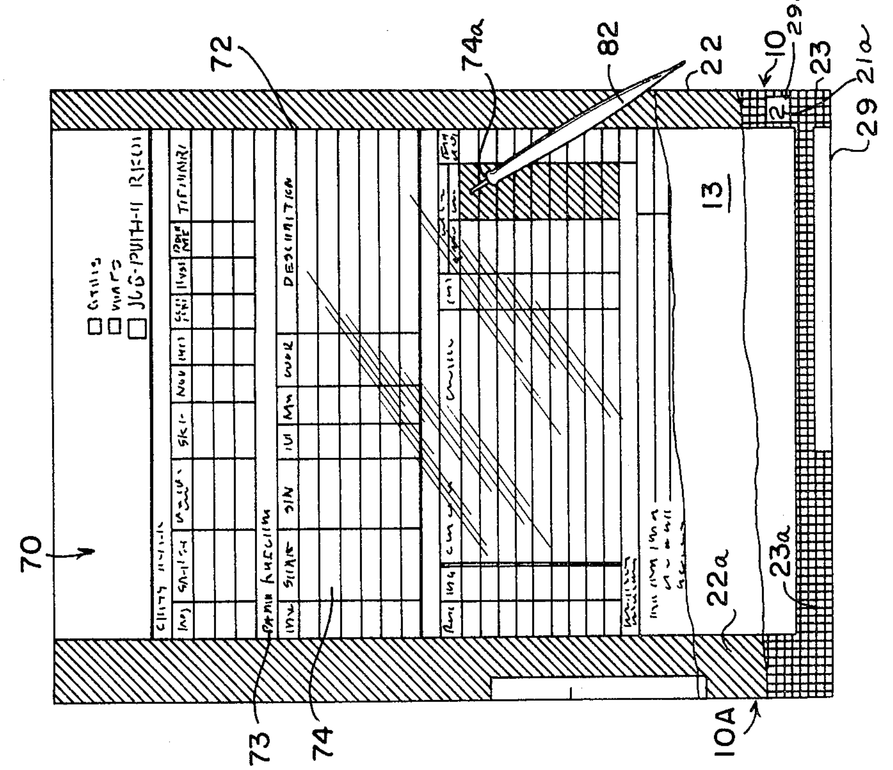
FIG. 10 is a plan view, partially cut-away of the combination of a transparent overlay superposed in registry with a standardized set wherein the overlay has a window in the image area which defines specific data areas or identifies data placed in a specific area.

Overlays having input identifying indicia imprinted in their image areas are shown in FIGS. 10 and 11, respectively, in combination with sets of the invention having a plain image area. The overlay and sets provide a data encrypting-deciphering combination usable if security or confidentiality is needed regarding data.

In FIG. 10 a transparent overlay 70 made of mylar or other plastic-like material is shown superposed upon the set 10A of the invention described previously. The central image area 72 of transparent overlay 70 contains data input identifying indicia 73 including windows 74 in which data can be encrypted. If encrypting is to be performed by numerous persons, each making a separate entry therein, different windows 74*a* may be patterned on each individual's transparent overlay 70 denoting where that person is to enter data. Misplacement of data is then eliminated.

In FIG. 11 an opaque overlay made of a stiff plastic, cardboard, or the like is shown superposed upon the set 10A. The central image area 75 of opaque overlay 71 contains data input identifying indicia 76 in association with a window cutout 80 through the overlay in which data can be encrypted. Since data cannot be encrypted on the set 10A anywhere but through the cutout 80, data cannot be mislocated on the set.

Encrypting to apply data to the set 10A can be accomplished by writing with a writing instrument 81 such as a pencil or pen on the top sheet 22 of the set through the window cutout 80 of the opaque overlay 71 as shown in FIG. 11, or by forming the data with a stylus 82 applying pressure to the window 74 of the transparent overlay 70. Both actions activate the transfer copy means between sheets, described previously, forming an ink in the area of the respective windows or cutout on the front side of sheets thereunder. However, the top sheet 22 in FIG. 10 has no ink formed on it since the overlay has no transfer copy means. Use of carbon paper between the overlay and top sheet of the set 10A will allow reproduction on the top sheet also.

Deciphering is reading data from an individual sheet in a set. It should be noted that the data can be encrypted on the sheets in set 10A including numbers, letters, or symbols, which are meaningless without having an overlay to associate the data with its identifying indicia. An individual or organization receiving the sheet then superposes an identical overlay in that person's possession on the sheet making the data meaningful. The transparent overlay of FIG. 10 allows the encrypter and decipherer access to the entire sheet surface of the set 10A. Since the opaque overlay 71 limits the area on which data can be encrypted on a set or deciphered from a sheet, it is useful for selective need-to-know situations.

Another modification of the invention includes coded file folders and envelopes for the sheets of the invention. Such a folder 90 is shown in FIG. 12 in combination with a sheet 22 of the set. Folder 70 includes a front panel 91 superposed with a back panel 92 and connected together along edge 93. Sheet 22 is inserted between the panels. Holes 94 adjacent edge 93 and on the front panel 91 of the folder may be utilized to readily identify; first, if a sheet is placed in the folder, and second, if that sheet is in its proper folder. Holes 94*a* on the back panel 92 of folder 90 may be utilized to facilitate fastening sheet 22 therein. Coding 22*a* appearing through holes 94 matches the coding 95 on folder 90 if the sheet 22 is in its proper place. The coding 95 is shown adjacent a plurality of edges on folder 90, including a tab 96 on the back panel. It can be appreciated that folders may or may not need an image area 100 thereon, depending on use. If no image area is necessary, the location of the coding 95 may be other than peripheral. Also, windows or blocks 101, 102, and 103, may be utilized similarly as blocks 29, 30 on the sheets of a set.

A like coded envelope 104 is shown in FIG. 13. Envelope 104 includes a front panel 105, a back panel 106 connected to the front panel along edges 110, 111, and 112, and a conventional flap 113 located at the open end of the envelope front panel which folds over and coacts with the back panel to seal the vehicle. Holes 114 are utilized similarly to holes 94 in the folder, and block 115 has a use which may be identical to blocks 101, 102, and 103. Coding 116 is shown located marginally adjacent image area 117 along a plurality of edges of the front panel. Similarly to the folder, the identifying coding may be otherwise located on the envelope's exterior if the image area need not cover the entire central portion of the panel. It is best that no coding appear at corner 120 where postage stamps or a meter marking may be placed for mailing purposes. Transparent windows 121 and 122 located in image area 117 on the front panel of envelope 104 coincide with the positions of blocks 37, 39 on the back of certain sheets in a set. Placement of the sheets correctly in the envelope allows printing in the blocks to appear through the windows.

In order to develop the most efficient visually descriptive information transmission, storage, and retrieval set, printed data input identifying indicia inside the image area should be planned, tested, and perfected so the set functions correctly. In ordinary circumstances, systems designers or planners are sent to a location where the invention is to be utilized. The function which the information transmission, storage, and retrieval set is to perform is studied and analyzed. Then, a preliminarily reproduced visually descriptive information transmission, storage, and retrieval set is made to test and perfect the systems design or planning analysis.

The method of making such a preliminarily reproduced set utilizes overlays of the second modification of the invention shown in FIG. 9, a copy machine, sheets of paper having test input data identification indicia written centrally thereon, and other sheets of paper capable of being used in the copy machine. In this method, a first overlay sheet having a coded border is superposed with a test sheet having printed indicia thereon so that the printed indicia appears through the transparent portion of the sheet. The superposed combination is then placed in the copy machine to produce a copy sheet containing the additive features of centrally located test indicia and a coded border. Routing indicia may be added later or during copying by use of multiple overlays.

At this time another overlay sheet of the set having different coding means is substituted for the first overlay sheet. The second combination is then placed in the copy machine and a second copied sheet having the additive indicia and coded border features is produced. This method is then repeated until the predetermined number of sheets which are to make up a set are obtained. This set is then disseminated through the location of use to test for satisfactory results. If improvement is needed, a new sheet having changed test data input identifying indicia is made and the method is repeated substituting test sheets. Subsequent test sets are then produced and disseminated until the proper indicia is obtained. Then that indicia is placed in the image area of the sheets in the first embodiment of the invention at the same time the coding means is printed on a sheet.

It should be noted that some copy machines do not reproduce different colors. If this is the case regarding a copy machine utilized in this method, different color copy sheets may be utilized for preliminarily reproducing purposes. In this way different black patterns and black saturations are reproduced on the various color sheets for visual differentiation purposes. While this method is severely color limited and unsatisfactory for permanent use, it is sufficient for preliminary planning purposes. If the copy machine utilized will reproduce different colors, then the coding means on said transparent sheets can utilize various colors and the copy sheets can be substantially white. Also, it can be understood that paper fed into the copy machine may have printed coding and a blank image area thereon, wherein image area indicia can be reproduced.

It can be appreciated that the present invention can be utilized with fan fold sprocket driven continuous sheets commonly utilized in computer printout operations.

This is a division of application Ser. No. 892,104, filed Mar. 30, 1978, which is a continuation of application Ser. No. 483,634, filed June 27, 1974.

It will be understood that modifications and variations may be effected without departing from the scope of the novel concepts of the present invention, but it is understood that this application is to be limited only by the scope of the appended claims.

The invention is hereby claimed as follows:

1. A visually descriptive information transmission, storage, and retrieval set comprising a plurality of stacked sheets of substantially white paper, means for separably connecting said sheets together along one edge whereby each sheet may be separated from the set, an image area substantially centrally located on each sheet within which information may be inserted, means for transferring at least a portion of information recorded on the first sheet of the set during use thereof to a predetermined number of other sheets in the set, and colored printed coding means of a different nature on each sheet in the set outside of and between the image area and at least the bottom and side edges of each sheet, so that each sheet may be readily visually identified for routing to and filing in a predetermined place, said colored printed coding means being distinctive for each sheet by having differences from each other in pattern, color, or saturation, and including at least one substantially rectangular block on each sheet in said coding area between said bordered image area and an edge of said sheet, said block having printed indicia therein for further determination of at least one of the following: to whom the sheet goes, location of the sheet final resting place, the organizations which send and receive the sheet, and the purpose of the sheet.

* * * * *